United States Patent
Nakaya et al.

(10) Patent No.: US 11,256,236 B2
(45) Date of Patent: Feb. 22, 2022

(54) ABNORMALITY DETECTION DEVICE AND MACHINE TOOL INCLUDING ABNORMALITY DETECTION DEVICE

(71) Applicants: CITIZEN WATCH CO., LTD., Tokyo (JP); CITIZEN MACHINERY CO., LTD., Nagano (JP)

(72) Inventors: Takaichi Nakaya, Higashimurayama (JP); Yasuhiro Kera, Shiki (JP); Ayami Misono, Nagano (JP)

(73) Assignees: Citizen Watch Co., Ltd., Tokyo (JP); Citizen Machinery Co., Ltd., Nagano (JP)

( * ) Notice: Subject to any disclaimer, the term of this patent is extended or adjusted under 35 U.S.C. 154(b) by 0 days.

(21) Appl. No.: 16/754,343

(22) PCT Filed: Sep. 26, 2018

(86) PCT No.: PCT/JP2018/035545
§ 371 (c)(1),
(2) Date: Apr. 7, 2020

(87) PCT Pub. No.: WO2019/073793
PCT Pub. Date: Apr. 18, 2019

(65) Prior Publication Data
US 2020/0310393 A1    Oct. 1, 2020

(30) Foreign Application Priority Data
Oct. 12, 2017    (JP) .............................. JP2017-198156

(51) Int. Cl.
*G05B 19/418*    (2006.01)

(52) U.S. Cl.
CPC ... *G05B 19/41815* (2013.01); *G05B 19/4183* (2013.01); *G05B 19/4187* (2013.01)

(58) Field of Classification Search
None
See application file for complete search history.

(56) References Cited

U.S. PATENT DOCUMENTS

| | | |
|---|---|---|
| 5,663,894 A | 9/1997 | Seth |
| 2011/0209546 A1 | 9/2011 | Seuthe |

(Continued)

FOREIGN PATENT DOCUMENTS

| | | |
|---|---|---|
| CN | 102520672 A | 6/2012 |
| CN | 102825506 | 12/2012 |

(Continued)

OTHER PUBLICATIONS

Kwon et al., "Characterization of closed-loop measurement accuracy in precision CNC milling", Elsevier 2006 (Year: 2006).*

(Continued)

*Primary Examiner* — Carlos R Ortiz Rodriguez
(74) *Attorney, Agent, or Firm* — Knobbe, Martens, Olson & Bear, LLP

(57) ABSTRACT

An abnormality detection device of a machine tool includes a plurality of vibration sensors mounted on a body of the machine tool at a plurality of positions; and a determination portion that determines an operation condition of the machine tool based on vibration information detected by the vibration sensors. The abnormality detection device detects abnormality of the machine tool according to determination information of the determination portion. The determination portion specifies a predetermined item whose machining accuracy lowers based on the mounted position of the vibration sensor that has detected abnormal vibration.

6 Claims, 3 Drawing Sheets

(56) References Cited

U.S. PATENT DOCUMENTS

2011/0222980 A1    9/2011   Kuo et al.
2012/0318062 A1   12/2012   Tanaka
2018/0036848 A1    2/2018   Stockburger et al.

FOREIGN PATENT DOCUMENTS

| | | |
|---|---|---|
| CN | 204413763 U | 6/2015 |
| CN | 107052364 A | 8/2017 |
| DE | 102012210118 A1 | 12/2012 |
| EP | 3278923 A1 | 2/2018 |
| JP | 9-204219 A | 8/1997 |
| JP | 10-267749 | 10/1998 |
| JP | 2007-190628 A | 8/2007 |
| JP | 2013-000837 A | 1/2013 |
| JP | 6397807 B2 | 9/2018 |

OTHER PUBLICATIONS

Extended European Search Report for EP 18865867.8 dated Apr. 16, 2021.
Decision to Grant in Japanese Patent Application No. 2017-198156 dated Jan. 26, 2021.
Office Action for CN 201880057559.4 dated Jan. 26, 2021.

\* cited by examiner

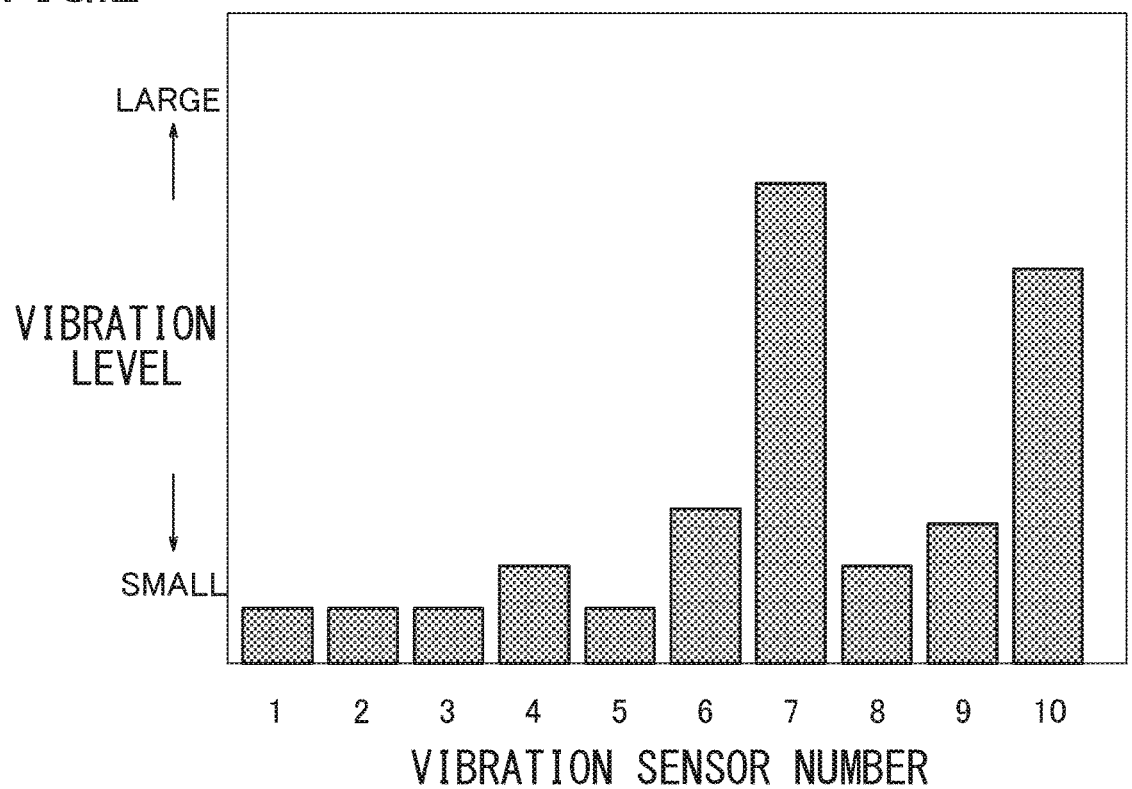

ABNORMALITY DETECTION DEVICE AND MACHINE TOOL INCLUDING ABNORMALITY DETECTION DEVICE

CROSS-REFERENCE TO RELATED APPLICATION

The present application is a national stage application of PCT Application No. PCT/JP2018/035545, filed on Sep. 26, 2018, which claims priority to Japanese Patent Application No. 2017-198156 filed on Oct. 12, 2017, the disclosure of which is hereby incorporated by reference in its entirety.

TECHNICAL FIELD

This disclosure relates to an abnormality detection device and a machine tool including the same.

BACKGROUND ART

An abnormality detection device of a machine tool is conventionally known. The abnormality detection device includes a plurality of vibration sensors mounted on a body of the machine tool. The abnormality detection device determines an operation condition of the machine tool based on vibration information detected by each vibration sensor, and detects abnormality of the machine tool according to the determined information (see JP H10-267749A, for example).

The abnormality detection device detects an abnormal machining operation such as tool vibration, excessive cut, overfeeding, and overspeed based on abnormal vibration to diagnose a machining condition.

SUMMARY

However, as the abnormality detection device described in Patent Literature 1 diagnoses the machining condition from an abnormal machining operation such as tool vibration and overfeeding through complex calculation, it is not easy to specify a predetermined item whose machining accuracy lowers.

The present disclosure has been made in view of the above circumstances, and an object of the present disclosure is to provide an abnormality detection device and a machine tool including the same. The abnormality detection device is configured to specify a vibration sensor that has detected abnormal vibration and to easily specify a predetermined item whose machining accuracy lowers as an operation condition of a machine tool based on a mounted position of the specified sensor.

A first aspect of the present disclosure provides an abnormality detection device of a machine tool. The abnormality detection device includes a plurality of vibration sensors mounted on a body of the machine tool at a plurality of positions and a determination portion that determines an operation condition of the machine tool based on vibration information detected by the vibration sensors. The abnormality detection device detects abnormality of the machine tool according to determination information of the determination portion. The determination portion specifies a predetermined item whose machining accuracy lowers based on the mounted position of the vibration sensor that has detected abnormal vibration.

A second aspect of the present disclosure provides a machine tool including the abnormality detection device of the machine tool according to the present disclosure.

BRIEF DESCRIPTION OF DRAWINGS

FIG. 2 is a view illustrating a vibration level of each vibration sensor, which is obtained by a signal detected by each vibration sensor.

FIG. 3 is a view illustrating a data table (correspondence) in which predetermined items of machining accuracies and combination of mounted positions of vibration sensors whose vibration levels deteriorate when a predetermined item of a machining accuracy lowers are specified.

DETAILED DESCRIPTION

Figure 1:
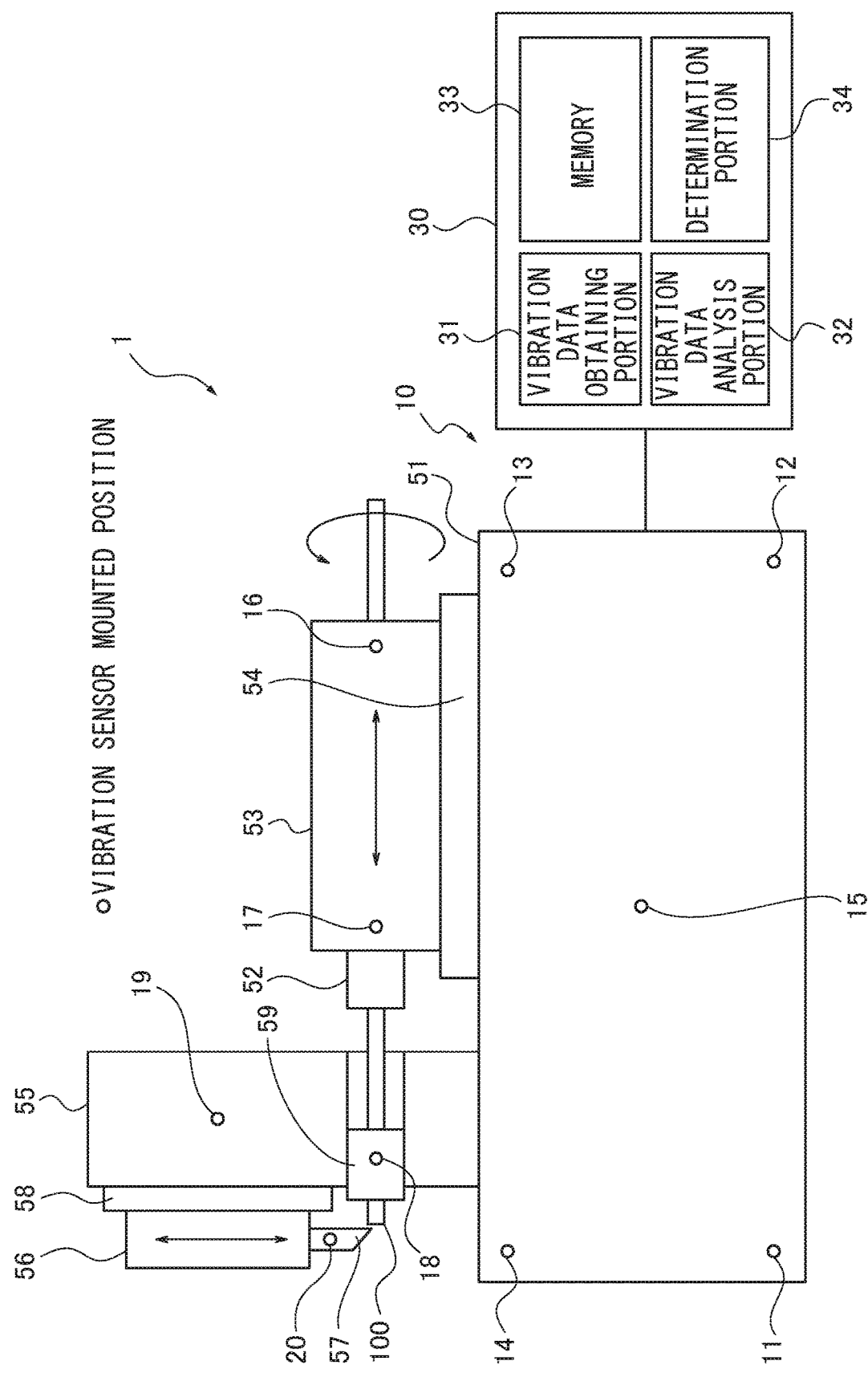
FIG. 1 is a schematic view illustrating a machine tool including an abnormal detection device as one embodiment of the present disclosure.

Hereinafter, an abnormality detection device and a machine tool including the same according to the present disclosure is described. As illustrated in FIG. 1, a machine tool 1 including an abnormality detection device 10 of the present embodiment includes a bed 51, a main spindle headstock 53 having a main spindle 52, and a tool post 56 having a tool 57 for machining. The main spindle headstock 53 and the tool post 56 are provided on the bed 51.

The main spindle 52 can hold a workpiece 100 through a chuck provided in a tip of the main spindle 52. The main spindle headstock 53 supports the main spindle 52 to be rotatable through a main spindle motor such as a built-in motor. The main spindle headstock 53 is placed on the bed 51 to be movable in a Z axis direction through a Z moving mechanism 54 in the Z axis direction along an axis line direction of the main spindle 52.

A tool post support body 55 is provided on the bed 51. The tool post support body 55 is disposed in front of the main spindle headstock 53. The tool post 56 is mounted on the tool post support body 55 to be movable in the X axis direction through an X moving mechanism 58 in the X axis direction which is an up and down direction orthogonal to the Z axis direction.

The tool post support body 55 is provided with a guide bush device 59 having the same axis line as the main spindle 52. The guide bush device 59 houses a guide bush that guides the workpiece 100 held by the main spindle 52 to be rotatable and movable in the Z axis direction. The tool post 56 is disposed in front of the guide bush.

A bar as the workpiece 100 (hereinafter, also referred to as a bar 100) is inserted from the rear of the main spindle 52, the bar 100 projects from the tip of the main spindle 52 at a predetermined length, and the bar 100 is inserted into the guide bush. A controller 30 controls a main spindle motor, a Z motor that moves the Z moving mechanism 54 in the Z axis direction, and an X motor that moves the X moving mechanism 58 in the X axis direction. The controller 30 also controls the rotation of the main spindle 52, the movement of the main spindle headstock 53 in the Z axis direction, and the movement of the tool post 56 in the X axis direction to guide the bar 100 to the guide bush. The bar 100 is thereby machined by the tool 57 near the front portion of the guide bush.

The abnormality detection device 10 of the present embodiment includes a plurality of vibration sensors 11, 12, . . . 20 (hereinafter, referred to as vibration sensors 11 to 20) that are mounted on the machine tool 1 at a plurality of predetermined positions, respectively. Each of the sensors 11 to 12 detects vibration at a predetermined position (mounted position) where each sensor is mounted. For example, the vibration sensors 11 to 14 are mounted on the end portions of the bed 51, respectively. The vibration sensor 15 is mounted on the center portion of the bed 51. The vibration sensors 16, 17 are mounted on both end portions of the main spindle headstock 53. The vibration sensor 18 is mounted on the guide bush device 59. The vibration sensor 19 is mounted on the tool post support body 55. The vibration sensor 20 is mounted on the tool 57. The predetermined positions where the vibration sensors 11 to 20 are mounted, respectively, are one example.

The signals detected by the respective vibration sensors 11 to 20 are input to the controller 30 of the abnormality detection device 10 such that the mounted positions of the respective vibration sensors 11 to 20 are distinguishable.

The controller 30 includes a vibration data obtaining portion 31, a vibration data analysis portion 32, a memory 33, and a determination portion 34. The vibration data obtaining portion 31 obtains the signals from the respective vibration sensors 11 to 20 after specifying the mounted positions of the vibration sensors 11 to 20 that output the respective signals. The vibration data analysis portion 32 analyzes the vibration data obtained by the vibration data obtaining portion 31. The determination portion 34 determines the operation condition of the machine tool 1 based on the vibration data analyzed by the vibration data analysis portion 32.

For example, when ten vibration sensors 11 to 20 are provided in ten mounted positions from a first mounted position to a tenth mounted position, respectively, ten sensor input portions from the sensor input portion at the first mounted position to the sensor input portion at the tenth mounted position are provided in the vibration data obtaining portion 31. Accordingly, the vibration sensors 11 to 20 at the mounted positions corresponding to the respective sensor input portions, respectively, can be coupled to the respective sensor input portions.

The vibration data analysis portion 32 analyzes the signal from each of the vibration sensors 11 to 20 obtained by the vibration data obtaining portion 31, and calculates information regarding the vibration data at each mounted position by the vibration sensor 11 to 20. For example, as illustrated in FIG. 2, the vibration data analysis portion 32 can be configured to calculate a vibration level of each of the vibration sensors 11 to 20 at the mounted position based on the signal from each vibration sensor 11 to 20. In addition, in FIG. 2, a vibration sensor number 1 is meant to be the vibration sensor 11 mounted at the first mounted position, a vibration sensor number 2 is meant to be the vibration sensor 12 mounted at the second mounted position. The following numbers are the same, and the vibration sensor number 10 is meant to be the vibration sensor 20 mounted at the tenth mounted position.

The memory 33 stores a data table (correspondence) illustrated in FIG. 3. The data table illustrated in FIG. 3 shows information about correspondence between predetermined items of machining accuracies and vibration that affects the accuracies of the respective items. The correspondence specifies the combination of the mounted positions of the vibration sensors 11 to 20 whose vibration levels deteriorate when the accuracies of the respective items lower.

The data table of the example illustrated in FIG. 3 shows the correspondence between the combination of the fourth mounted position, the sixth mounted position, and the tenth mounted position and the roundness as the predetermined item of the machining accuracy, the correspondence between the combination of the third mounted position, the eighth mounted position, and the ninth mounted position and the surface roughness as the predetermined item of the machining accuracy, the correspondence between the combination of the fifth mounted position and the eight mounted position and the end face flatness as the predetermined item of the machining accuracy, and the correspondence between the combination of the seventh position and the tenth position and the end face squareness as the predetermined item of the machining accuracy. In addition, the data table in FIG. 3 is an example.

The determination portion 34 calculates an affecting value that affects a predetermined item of each machining accuracy based on the data table stored in the memory 33 and the vibration level at each vibration sensor 11 to 20 calculated by the vibration data analysis portion 32, and calculates a lowering level in the accuracy with respect to each predetermined item of each machining accuracy according to the affecting value to be displayed on a display provided in the machine tool 1.

In the abnormality detection device 10 of the present embodiment, the determination portion 34 calculates the affecting value that affects the roundness based on the respective vibration levels of the vibration sensor 14 at the fourth mounted position, the vibration sensor 16 at the sixth mounted position, and the vibration sensor 20 at the tenth mounted position, and calculates a determination value that indicates a lowering level in the machining accuracy of the roundness according to the affecting value.

Similarly, the determination portion 34 calculates an affecting value that affects the surface roughness based on the respective vibration levels by the vibration sensor 13 at the third mounted position, the vibration sensor 18 at the eighth mounted position, and the vibration sensor 19 at the ninth mounted position, and calculates a determination value that indicates a lowering level in the machining accuracy of the surface roughness according to the affecting value. Similarly, the determination portion 34 calculates an affecting value that affects the end face flatness based on the respective vibration levels by the vibration sensor 15 at the fifth mounted position and the vibration sensor 18 at the eighth mounted position, and calculates a determination value that indicates a lowering level in the machining accuracy of the end face flatness according to the affecting value. Similarly, the determination portion 34 calculates an affecting value that affects the end face squareness based on the respective vibration levels by the vibration sensor 17 at the seventh mounted position and the vibration sensor 20 at the tenth mounted position, and calculates a determination value that indicates a lowering level in the machining accuracy of the end face squareness according to the affecting value.

When the determination value exceeds a predetermined threshold, the determination portion 34 in the abnormality detection device 10 of the present embodiment determines the item corresponding to the determination value that exceeds the threshold as a predetermined item whose machining accuracy lowers as the operation condition of the machine tool 1.

Figure 4:
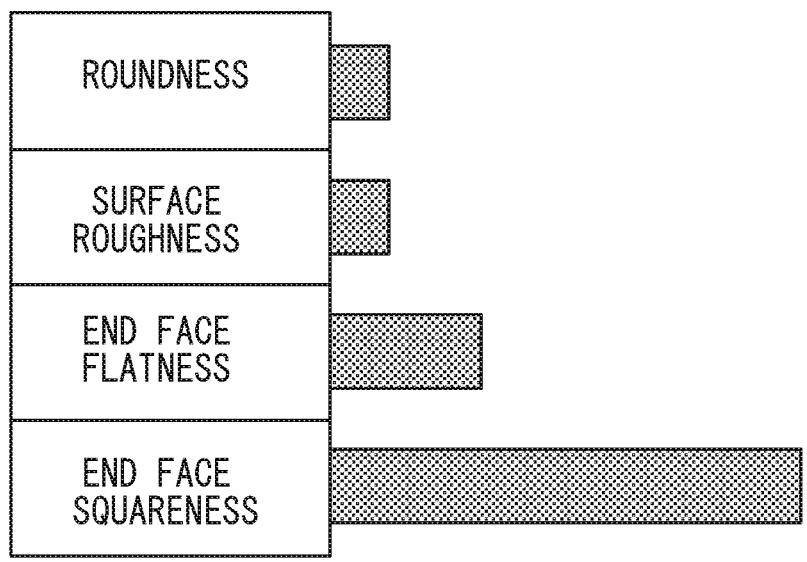
FIG. 4 is a view illustrating a determination value for a roundness, a surface roughness, an end face flatness, and an end face squareness.

For example, as illustrated in FIG. 2, when each of the vibration levels by the vibration sensor 17 at the seventh mounted position and the vibration sensor 20 at the tenth mounted position is larger than each of the vibration levels by the vibration sensors at the other mounted positions, and the vibration data analysis portion 32 analyzes the abnormal vibration of the machine tool at the seventh mounted position and the tenth mounted position, as illustrated in FIG. 4, the determination portion 34 calculates the determination value that indicates the lowering level in the end face squareness according to the affecting value that affects the end face squareness calculated based on the combination of the respective vibration levels by the vibration sensor 17 at the seventh mounted position the vibration sensor 20 at the tenth mounted position to be higher than the determination value that indicates the lowing level in each item according to the affecting value calculated based on the combination of the vibration levels by the vibration sensors at the respective mounted positions corresponding to the roundness, the surface roughness, and the end face flatness, which are the other items.

In FIG. 4, since the determination value corresponding to the end face squareness exceeds a preset threshold, the determination portion 34 specifies the end face squareness as the item whose machining accuracy lowers as the operation condition of the machine tool 1. In addition, the determination portion 34 may simply present a determination value for each item as a reference for user's determination without determining whether the determination value exceeds a threshold or not.

In the abnormality detection device 10 and the machine tool 1 of the present embodiment, the determination portion 34 specifies the item whose machining accuracy lowers to determine the abnormality of the machining operation associated with the specified item, and to determine possibility of abnormality of a part associated with the machining operation determined as abnormal. For example, when abnormal vibration that lowers the end face squareness occurs, it is determined that the machining operation associated with the end face squareness in the machine tool 1 becomes abnormal, so that it is possible to determine the possibility of the abnormality of the part associated with the machining operation.

What is claimed is:

1. An abnormality detection device of a machine tool, the abnormality detection device comprising:
   a plurality of vibration sensors mounted on a body of the machine tool at a plurality of positions; and
   a determination portion that determines an operation condition of the machine tool based on vibration information detected by the plurality of vibration sensors,
   wherein the abnormality detection device is configured to detect abnormality of the machine tool according to determination information of the determination portion, and
   wherein the determination portion is configured to specify a predetermined item whose machining accuracy lowers based on a mounted position of a respective vibration sensor of the plurality of vibration sensors that has detected abnormal vibration.

2. The abnormality detection device according to claim 1, comprising:
   a memory that stores correspondence between a combination of predetermined vibration sensors and the predetermined item, wherein
   the determination portion is configured to specify the predetermined item whose machining accuracy lowers by selecting, based on the correspondence, the predetermined item according to a combination of the vibration sensors that have detected abnormal vibration.

3. A machine tool comprising the abnormality detection device of the machine tool according to claim 1.

4. An abnormality detection device of a machine tool, the abnormality detection device comprising:
   a plurality of vibration sensors mounted on a body of the machine tool at a plurality of positions; and
   a determination portion that determines an operation condition of the machine tool based on vibration information detected by the plurality of vibration sensors,
   wherein the abnormality detection device is configured to detect abnormality of the machine tool according to determination information of the determination portion, and
   wherein the determination portion is configured to specify a predetermined aspect of abnormality whose machining accuracy is lowered, based on a mounted position of a respective vibration sensor of the plurality of vibration sensors that has detected abnormal vibration according to the operation condition, the mounted position associated with the predetermined aspect of abnormality.

5. The abnormality detection device according to claim 4, comprising:
   a memory that stores correspondence between a combination of predetermined vibration sensors and a plurality of respective predetermined aspects of abnormality, the plurality of predetermined aspects of abnormality including the predetermined aspect of abnormality, wherein
   the determination portion is configured to specify the predetermined aspect of abnormality whose machining accuracy is lowered by identifying, based on the correspondence, the predetermined aspect of abnormality according to a combination of the vibration sensors that have detected abnormal vibration.

6. A machine tool comprising the abnormality detection device of the machine tool according to claim 4.

* * * * *